(12) United States Patent
Meniere et al.

(10) Patent No.: US 7,302,081 B2
(45) Date of Patent: Nov. 27, 2007

(54) METHOD FOR DETECTING NEW OBJECTS IN AN ILLUMINATED SCENE

(75) Inventors: Jerome Meniere, Paris (FR); Martin Lefebure, Courbevoie (FR); Frederic Guichard, Paris (FR); Abdelmounim Belahmidi, Colombes (FR)

(73) Assignee: Vision IQ, Boulogne (FR)

( * ) Notice: Subject to any disclaimer, the term of this patent is extended or adjusted under 35 U.S.C. 154(b) by 785 days.

(21) Appl. No.: 10/432,619

(22) PCT Filed: Dec. 5, 2001

(86) PCT No.: PCT/FR01/03840

§ 371 (c)(1),
(2), (4) Date: Jun. 5, 2003

(87) PCT Pub. No.: WO02/46795

PCT Pub. Date: Jan. 13, 2002

(65) Prior Publication Data

US 2004/0062441 A1    Apr. 1, 2004

(30) Foreign Application Priority Data

Dec. 6, 2000 (FR) .................................. 00 15803
Dec. 6, 2000 (FR) .................................. 00 15805

(51) Int. Cl.
*G06K 9/00*  (2006.01)
(52) U.S. Cl. ...................... 382/103; 382/107; 382/203

(58) Field of Classification Search ................ 382/103, 382/107, 203; 348/169
See application file for complete search history.

(56) References Cited

U.S. PATENT DOCUMENTS

| 4,779,095 A | 10/1988 | Guerreri |
| 5,684,898 A | 11/1997 | Brady et al. |
| 6,173,066 B1* | 1/2001 | Peurach et al. ............. 382/103 |
| 6,421,463 B1* | 7/2002 | Poggio et al. ............. 382/224 |

FOREIGN PATENT DOCUMENTS

| FR | 2 763 459 | 11/1998 |
| JP | 62-251879 | 11/1987 |
| JP | 5-157529 | 6/1993 |
| JP | 7-302339 | 11/1995 |
| JP | 8-212354 | 8/1996 |
| JP | 10-70654 | 3/1998 |

OTHER PUBLICATIONS

Tracking complex primitives in an image sequence, Bascle et al., 1994,IEEE.*

\* cited by examiner

*Primary Examiner*—Bhavesh M. Mehta
*Assistant Examiner*—John B Strege
(74) *Attorney, Agent, or Firm*—Oblon, Spivak, McClelland, Maier & Neustadt, P.C.

(57) ABSTRACT

A method for detecting new objects in a scene illuminated by lights not necessarily constrained. The method detects and produces, in particular with a video camera, in the form of electric signals, video images, at successive times, digitizes the resulting electric signals, and produces image digital data, in particular pixels, at successive times. Then, the image digitalis stored and the type of object, the trajectory, and attitude changes of the object are estimated.

4 Claims, 6 Drawing Sheets

FIG_1a

FIG_1b

FIG_1c

FIG_2a

FIG_2b

FIG_2c

FIG_3a, FIG_3b, FIG_4a, FIG_4b

FIG_5

FIG_6

METHOD FOR DETECTING NEW OBJECTS IN AN ILLUMINATED SCENE

THE PROBLEM POSED

The problem posed is that of detecting new objects in a scene illuminated by lights that are not necessarily controlled, or in other words that are produced by artificial or natural illumination, the scene being observed by means of at least one sensor, such as a video camera, capable of delivering a succession of images. The present invention solves this problem.

To the knowledge of the inventors, the prior art does not contain a complete or satisfactory solution to this problem.

In the traditional method of detecting objects from a single camera, a reference image materialized by an average of images acquired over a prolonged duration is formed. Objects are detected by applying a threshold to the difference between the last image and the reference image. Any large difference indicates the presence of an object.

For two main reasons, this traditional method is not applicable in the case of scenes illuminated by lights that are not controlled. The first reason is that, because the illumination conditions are not controlled, any change of light induces a change in the images and therefore induces detections that do not correspond to new objects. The second is that this method will also detect shadows or light spots as new objects.

The patent application filed on Dec. 21, 1999 by Poséidon for a "Method and system for detecting an object against a background" under No. 99/16124 and published on Jun. 22, 2001 under No. FR2802653, referred to hereinafter as Kernel4 technology, describes a method and a system based on a stereoscopic principle. It is capable of detecting objects independently of the illumination conditions and while discriminating shadow phenomena from real objects. For its operation, however, it necessitates the use of at least two cameras.

DEFINITIONSI

The definitions explained hereinafter of the technical terms employed are illustrated by examples with reference to FIGS. 1a, 1b, 1c, 2a, 2b, 2c, 3a, 3b, 4a, 4b and 5. These figures represent an image composed of a grid of pixels, on which the values thereof have been indicated.

Image, Grid, Pixel, Pixel Value

A pixel is defined as follows: an elemental zone of an image obtained by creating a grid, generally regular, of the said image. When the image originates from a sensor such as a video camera or a thermal or acoustic camera, a value can generally be assigned to this pixel: the color or gray level for a video image, or the temperature for a thermal camera.

Figure 1A:
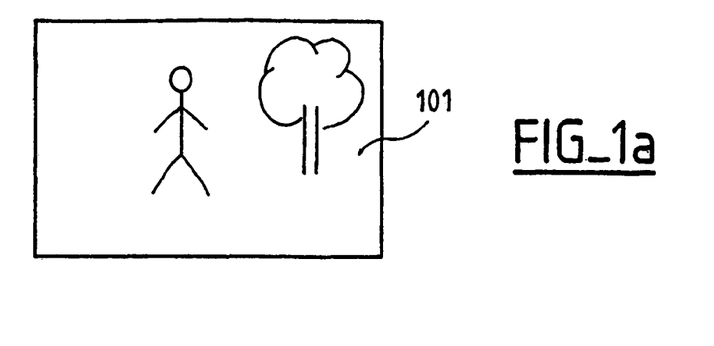
FIGS. 1a, 1b, 1c each represents an image composed of a grid of pixels, on which the values thereof have been indicated.
Figure 1B:
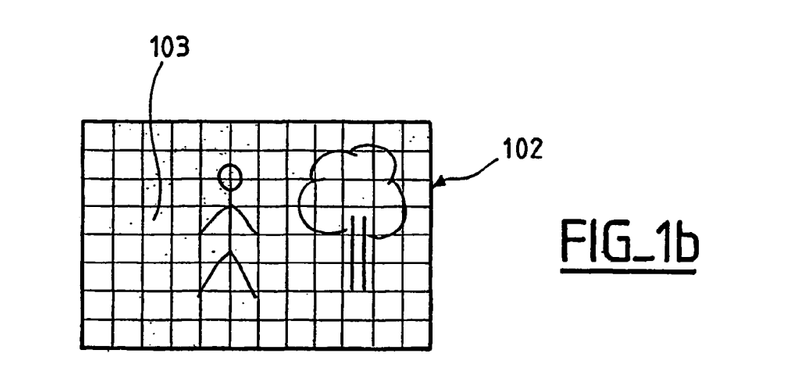
Figure 1C:
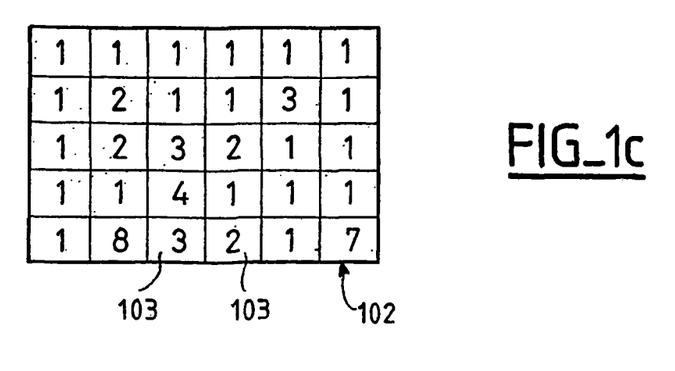

Example:

FIG. 1a represents an image 101 (symbolized by a man and a tree). In FIG. 1b, a grid 102 of pixels 103 was superposed on this image. FIG. 1c shows a grid on which the values of the pixels are indicated.

Adjacent Pixels

Two pixels of the grid are said to be adjacent if their edges or corners are touching.

Path On The Grid

A path on the grid is an ordered and finite set of pixels in which each pixel is adjacent to that following it (in the direction of ordering). The size of a path is given by the number of pixels of which it is composed.

Joined Pixels

Two pixels are said to be joined when the shortest path beginning at one and ending at the other is of size smaller than a specified number of pixels.

Connected Set Of Pixels

A set of pixels is said to be connected if, for each pair of pixels of the set, there exists a path beginning at one and ending at the other, this path being composed of pixels of the set.

Figure 2A:
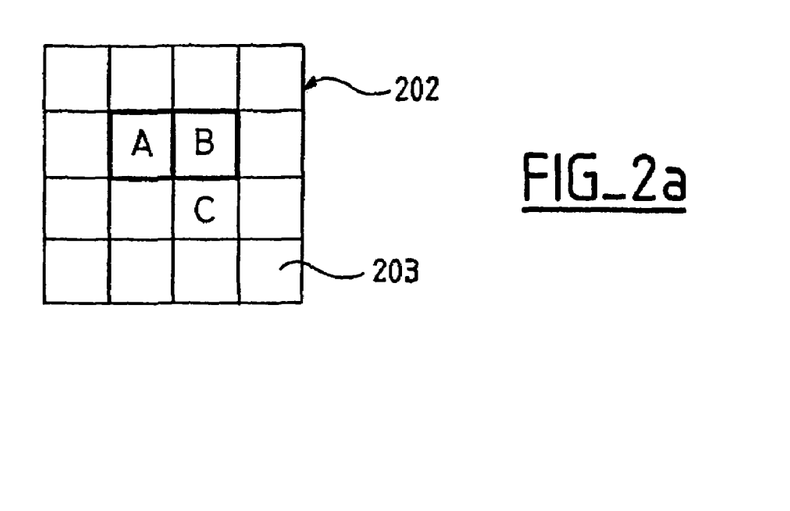
FIGS. 2a, 2b, 2c each represents an image composed of a grid of pixels, on which the values thereof have been indicated.

Example:

FIG. 2a represents a grid 202 of 16 pixels 203, among which 3 pixels were specifically identified as A, B and C. It can be noted that pixels A and B are adjacent, and that pixels B and C are adjacent. Thus there exists a path (A->B->C) that links these pixels. The set of pixels {A, B, C} is therefore connected.

Figure 2B:
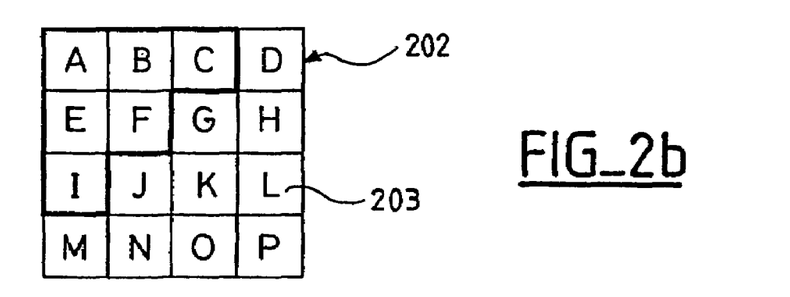

FIG. 2b also shows a grid 202 of 16 pixels 203, identified by the letters A to P. If the set of pixels {A, B, C, E, F, I} is selected, it can be noted that pixels A and B are adjacent, that pixels B and C are adjacent, and so on. Thus there exist the following paths: A->B->C and C->B->F->E->I. Each pair of pixels of the set is linked by a path of pixels belonging to the set, and so the set of pixels {A, B, C, E, F, I} is connected.

Figure 2C:
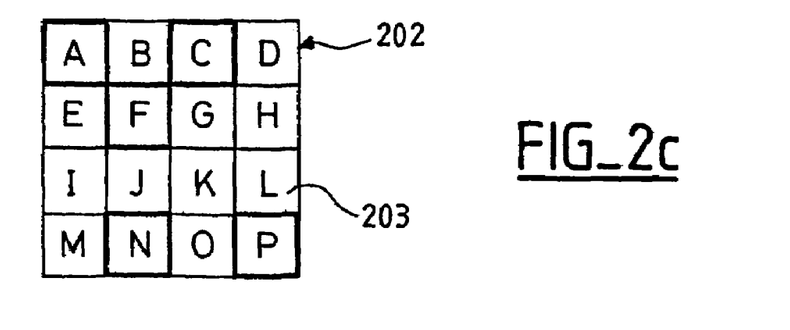

FIG. 2c shows the same grid 202 as in FIG. 2b, with the set of pixels {A, C, F, N, P} selected. There exists a path A->C->F linking the pixels A, C and F, but there does not exist a path of pixels that belongs to the set and that links N and P or else N to A. The set of pixels {A, C, F, N, P} is not connected. In contrast, the set {A, C, F} is connected.

Pixel Adjacent To A Set

A pixel that does not belong to a set is said to be adjacent to the said set when it is joined to at least one pixel belonging to the said set.

Calotte

A positive (or negative) calotte is defined as a connected set of pixels whose values are larger (or smaller) than a predetermined value and satisfying the following condition:

the values of the pixels adjacent to the set (not members of the set) are smaller than or equal to (or larger than or equal to) the said predetermined value, such that the values of the pixels located in the said set are larger (or smaller) than the values of the pixels adjacent to the set.

A calotte is said to be a positive calotte or a negative calotte.

Level Of A Calotte

The level of a calotte is defined as the said predetermined value.

Example:

FIGS. 3a, 3b, 3c and 3d represent images composed of grids 302 of pixels 303, on which their values are indicated.

Figure 3A:
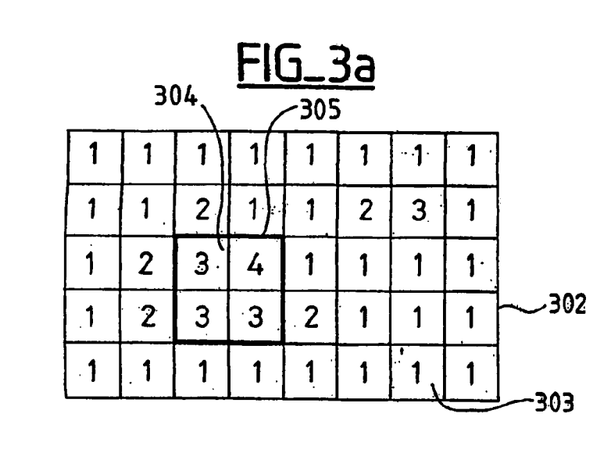
FIGS. 3a, 3b each represent an image composed of a grid of pixels, on which the values thereof have been indicated.

FIG. 3a represents (in the interior 304 of the bold line 305) a set of 4 pixels. This set has the following properties:
- it is connected within the meaning of the given definition,
- the values of all of the pixels of the set are larger than 1,
- some of the (twelve) pixels adjacent to the set have values larger than 1.

Thus the set of pixels in question is not a positive calotte of level 1.

In contrast, this set of pixels has the following properties:
- it is connected within the meaning of the given definition,
- the values of all of the pixels of the set are larger than 2,
- all of the (twelve) pixels joined to the set have a value smaller than or equal to 2.

This set of pixels is therefore a positive calotte of level 2.

Figure 3B:
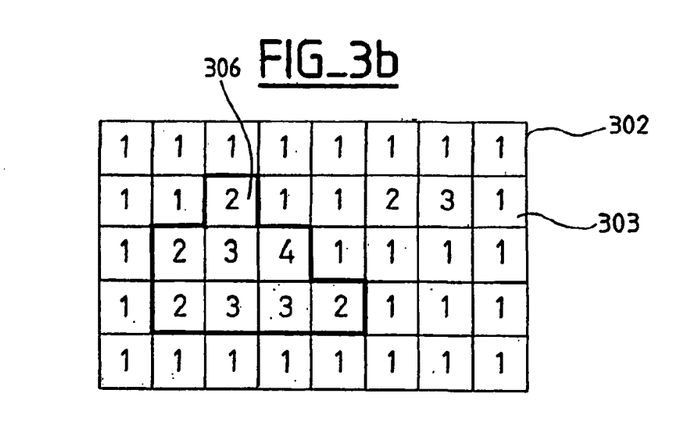

FIG. 3b represents a set 306 of eight pixels having the following properties:
- it is connected within the meaning of the given definition,
- the values of all of the pixels of the set are larger than 1,
- all of the (eighteen) pixels joined to the set have a value smaller than or equal to 1.

Thus the set of pixels in question is a positive calotte of level 1.

Figure 4A:
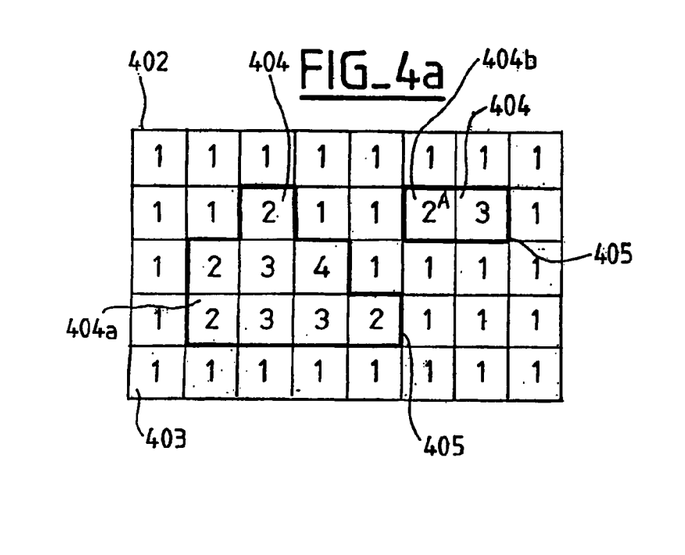
FIGS. 4a, 4b each represent an image composed of a grid of pixels, on which the values thereof have been indicated.

FIG. 4a represents a grid 402 of pixels 403. Inside this grid 402 a bold line 405 isolates a set 404 of ten pixels distributed into two zones 404a and 404b. This set 404 of pixels has the following properties:
- it is not connected within the meaning of the given definition,
- the values of all of the pixels are larger than 1,
- all of the (twenty-five) pixels joined to the set have a value smaller than or equal to 1.

Thus the ten pixels of this non-connected set do not comprise a positive calotte of level 1.

Figure 4B:
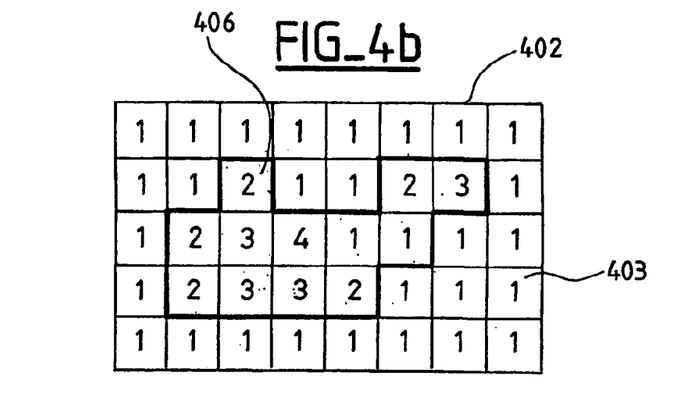

FIG. 4b represents a set 406 of twelve pixels having the following properties:
- it is connected within the meaning of the given definition,
- the values of the pixels are not all larger than 1,
- all of the (twenty-four) pixels joined to the set have a value smaller than or equal to 1.

Thus the set of pixels in question is not a positive calotte of level 1.

Characteristic(s) Associated With A Calotte

A characteristic or characteristics associated with a calotte is or are defined as a value or values obtained by predefined arithmetic and/or logical operations from the values of the pixels of the calotte, and/or from the positions of the pixels in the grid, and/or from the level of the calotte.

For example, an arithmetic operation could comprise using the sum of the differences between the value of each pixel of the calotte and the level of the calotte, or else the size (number of pixels) of the said calotte.

Materialized Calotte

A materialized calotte is defined as a calotte whose associated characteristics are in a specified value range.

Primitive Associated with A Pixel

The primitive associated with a pixel is defined as a binary value (or in other words 0 or 1) or a Boolean value (or in other words true or false, where in this case the convention will be used that true corresponds to 1 and false corresponds to 0) obtained by predefined arithmetic and/or logical operations from the value of the said pixel and from the values of the pixels joined thereto.

Figure 5:
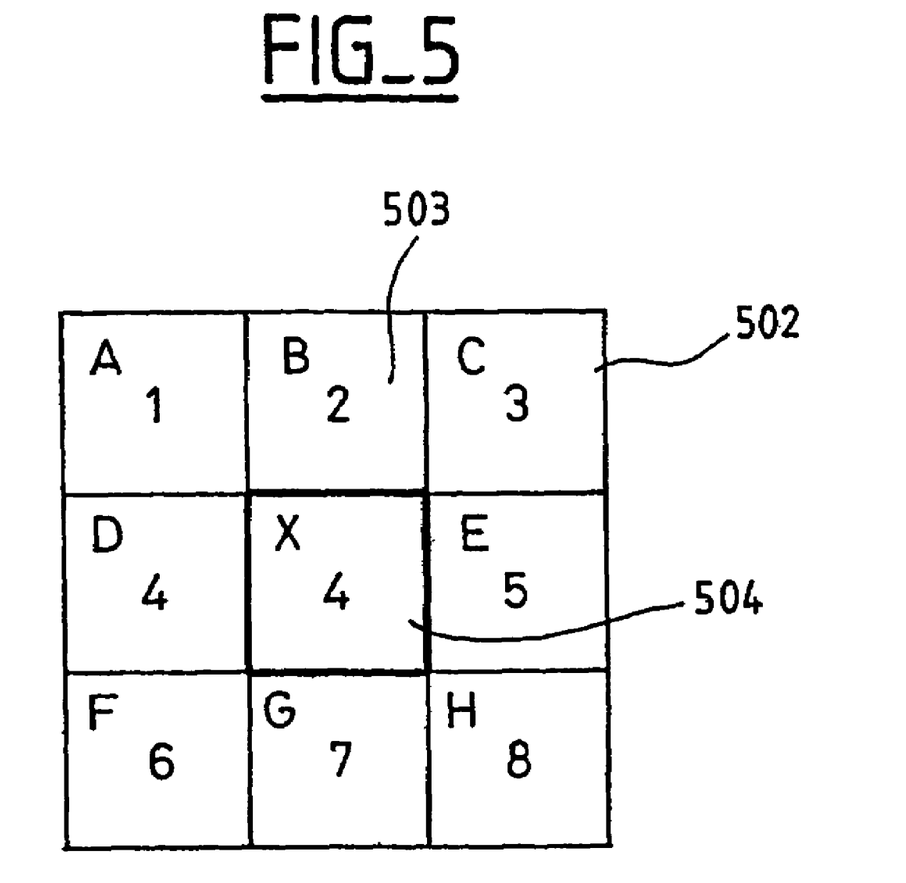
FIG. 5 represents an image composed of a grid of pixels, on which the values thereof have been indicated.

Example:

FIG. 5 shows a grid 502 of nine pixels 503, wherein one pixel X has a value of 4 and is represented by the symbol 504. This pixel 504 is surrounded by pixels A, B, C, D, E, F, G and H, whose respective values are 1, 2, 3, 4, 5, 6, 7 and 8.

If 2 is selected as the maximum path length for the definition of joined pixels, there can be associated with pixel 504 the following primitives Pa, Pb, Pc, Pd, Pe, Pf, Pg and Ph:

Pa: =>logical result of the test: the value of X is larger than the value of A.

Pb: =>logical result of the test: the value of X is larger than the value of B.

And so on for C, D, E, F, G, H.

There are obtained the primitives Pa, Pb, Pc, Pd, Pe, Pf, Pg and Ph, whose possible values are "true" and "false", which can also be written respectively as 1 and 0.

Materialized Primitive

A primitive will be said to be materialized if its value is equal to 1.

In the case of the example described in the foregoing, the following table is obtained:

Pa: false ⇔0: the primitive is not materialized
Pb: false ⇔0: the primitive is not materialized
Pc: false ⇔0: the primitive is not materialized
Pd: false ⇔0: the primitive is not materialized
Pe: true ⇔0: the primitive is materialized
Pf: true ⇔0: the primitive is materialized
Pg: true ⇔0: the primitive is materialized
Ph: true ⇔0: the primitive is materialized

THE INVENTIVE CONCEPTS ACCORDING TO THE INVENTION

The present invention relates to a method for detecting new objects in a scene illuminated by lights that are not necessarily controlled, the scene being observed by means of at least one sensor, such as a video camera, capable of delivering a succession of images. Within the meaning of the present invention, lights that are not necessarily controlled are defined as lights produced by artificial illumination or natural illumination. The method according to the invention comprises several stages. It comprises:
- the stage of detecting and of producing the said images in the form of electrical signals at successive instants,
- the stage of digitizing the obtained electrical signals and of producing digital image data, especially pixels, at successive instants,
- the stage of storing the said digital image data,
- the stage of estimating the nature of an object and the trajectory and changes in attitude of the object.

The said stage for estimating the nature of an object and the trajectory and changes in attitude of the object includes the stage of extracting, from the said successive images, primitives and/or calottes, which are not very sensitive to the illumination conditions and are suitable for being used for efficient discrimination between light spots and objects.

Branch 1:

According to a first embodiment of the invention, the said method preferably comprises:

the stage of associating a primitive or primitives (within the meaning of the present invention) with each pixel, the stage of counting, at regular time intervals dt over a time period T1, for each pixel and for each of the primitives associated with the said pixel, the number N1 of times that each primitive is materialized.

If the number N1 of times that a primitive is materialized exceeds a threshold S1, the said primitive is said to be usually materialized during the time period T1; in the opposite case the said primitive is said to be usually not materialized during the time period T1.

The said method also comprises the stage of counting, at regular time intervals dt during a time period T2 chosen to be shorter than T1, for each pixel and for each of the primitives associated with the said pixel, the number N2 of times that each primitive is materialized. If the number N2 of times that the said primitive is materialized exceeds a threshold S2, the said primitive is said to be usually materialized during the time period T2; in the opposite case the said primitive is said to be usually not materialized during the time period T2.

The said method also comprises the stage of determining whether a change has occurred in a primitive associated with a pixel, by applying one or the other of the following criteria:

the said primitive is usually materialized during the time period T1 and is usually not materialized during the time period T2, the said primitive is usually materialized during the time period T2 and is usually not materialized during the time period T1.

The said method also comprises the stage of counting, for each pixel, the number N3 of changes in the primitives associated with the said pixel. If the number N3 of changes exceeds a threshold S3, equal in particular to half of the number of primitives associated with the said pixel, it is said that a change has occurred in the said pixel.

The said method also comprises the stage of detecting whether a new object has appeared, by determining whether a change has occurred in a connected set of pixels.

Advantageously, the method according to the invention also comprises the stage of tripping alarm means in the event of suspect trajectory or movement of the said object.

Branch 2:

According to a second embodiment of the invention, the said method preferably comprises:

the stage of associating one or more characteristics with the said calottes, the stage of selecting the calottes whose characteristics exceed a threshold, the stage of counting, for each pixel, at regular time intervals dt during a time period T1, the number N1 of times that the said pixel belongs to the said selected calotte.

If the number N1 of times that the said pixel belongs to the said selected calotte exceeds a threshold S1, the said pixel is said to be usually present during the time period T1; in the opposite case the said pixel is said to be usually not present during the time period T1.

The said method also comprises the stage of counting, at regular time intervals dt during a time period T2 chosen to be shorter than T1, for each pixel, the number N2 of times that the said pixel belongs to the said selected calotte. If the number N2 of times that the said pixel belongs to the said calotte exceeds a threshold S2, the said pixel is said to be usually present during the time period T2; in the opposite case the said pixel is said to be usually not present during the time period T2.

The method also comprises the stage of determining whether a change has occurred in a pixel, by applying one or the other of the following criteria:

the said pixel is usually present during the time period T1 and is usually not present during the time period T2, the said pixel is usually present during the time period T2 and is usually not present during the time period T1.

The said method also comprises the stage of detecting whether a new object has appeared, by detecting whether a change has occurred in a connected set of pixels.

Advantageously, the method also comprises the stage of tripping alarm means in the event of suspect trajectory or movement of the said object.

SYSTEM

The present invention also relates to a system for detecting new objects in a scene illuminated by lights that are not necessarily controlled, the scene being observed by means of at least one sensor, such as a video camera, capable of delivering a succession of images. Within the meaning of the present invention, lights that are not necessarily controlled are defined as lights produced by artificial illumination or natural illumination.

The system according to the invention comprises:

detecting means for detecting and for producing the said images in the form of electrical signals at successive instants, means for digitizing the obtained electrical signals in order to produce digital image data, especially pixels, at successive instants, means for storing the said digital image data, means for estimating the nature of an object and the trajectory and changes in attitude of the object.

The means for estimating the nature of an object and the trajectory and changes in attitude of the object include information-processing means for extracting, from the said successive images, primitives and/or calottes which are not very sensitive to the illumination conditions and are suitable for being used for efficient discrimination between light spots and objects.

Branch 1:

According to a first embodiment, the system preferably comprises:

associating means for associating a primitive or primitives (within the meaning of the present invention) with each pixel, first counting means for counting, at regular time intervals dt over a time period T1, for each pixel and for each of the primitives associated with the said pixel, the number N1 of times that each primitive is materialized.

If the number N1 of times that a primitive is materialized exceeds a threshold S1, the said primitive is said to be usually materialized during the time period T1; in the opposite case the said primitive is said to be usually not materialized during the time period T1.

The system also comprises second counting means for counting, at regular time intervals dt during a time period T2 chosen to be shorter than T1, for each pixel and for each of the primitives associated with the said pixel, the number N2 of times that each primitive is materialized. If the number N2 of times that the said primitive is materialized exceeds a threshold S2, the said primitive is said to be usually materialized during the time period T2; in the opposite case the said primitive is said to be usually not materialized during the time period T2.

The system also comprises discriminating means for determining whether a change has occurred in a primitive associated with a pixel, by applying one or the other of the following criteria:

the said primitive is usually materialized during the time period T1 and is usually not materialized during the time period T2, the said primitive is usually materialized during the time period T2 and is usually not materialized during the time period T1.

The system also comprises third counting means for counting, for each pixel, the number N3 of changes in the primitives associated with the said pixel. If the number N3 of changes exceeds a threshold S3, equal in particular to half of the number of primitives associated with the said pixel, it is said that a change has occurred in the said pixel.

The system also comprises detecting means for detecting whether a new object has appeared, by determining whether a change has occurred in a connected set of pixels.

Advantageously, in the case of this first embodiment (branch 1), the system also comprises alarm means for tripping an alarm signal in the event of suspect trajectory or movement of the said object.

Branch 2:

According to a second embodiment, the system preferably comprises:

associating means for associating one or more characteristics with the said calottes, selecting means for selecting the calottes whose characteristics exceed a threshold, fourth counting means for counting, for each pixel, at regular time intervals dt during a time period T1, the number N1 of times that the said pixel belongs to the said selected calotte.

If the number N1 of times that the said pixel belongs to the said calotte exceeds a threshold S1, the said pixel is said to be usually present during the time period T1; in the opposite case the said pixel is said to be usually not present during the time period T1.

The system also comprises fifth counting means for counting, at regular time intervals dt during a time period T2 chosen to be shorter than T1, for each pixel, the number N2 of times that the said pixel belongs to the said selected calotte. If the number N2 of times that the said pixel belongs to the said calotte exceeds a threshold S2, the said pixel is said to be usually present during the time period T2; in the opposite case the said pixel is said to be usually not present during the time period T2.

The system also comprises discriminating means for determining whether a change has occurred in a pixel, by applying one or the other of the following criteria:

the said primitive is usually present during the time period T1 and is usually not present during the time period T2, the said pixel is usually present during the time period T2 and is usually not present during the time period T1.

The system also comprises detecting means for detecting whether a new object has appeared, by detecting whether a change has occurred in a connected set of pixels.

Advantageously, the system also comprises alarm means for tripping an alarm signal in the event of suspect trajectory or movement of the said object.

DETAILED DESCRIPTION OF FIGURES

Figure 6:
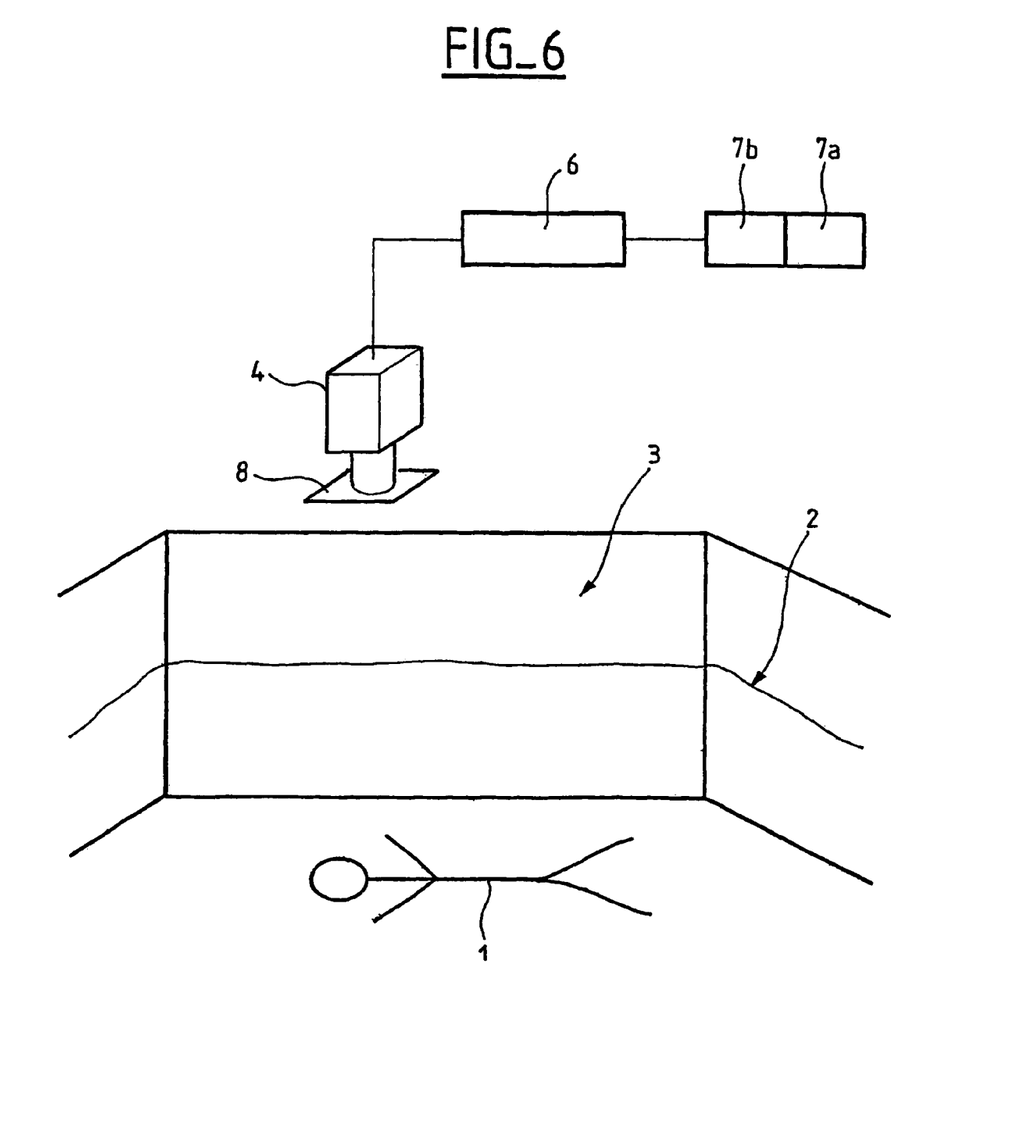
FIG. 6 represents a general view of the system that permits the detection of objects by using the method according to the present application.
Figure 7:
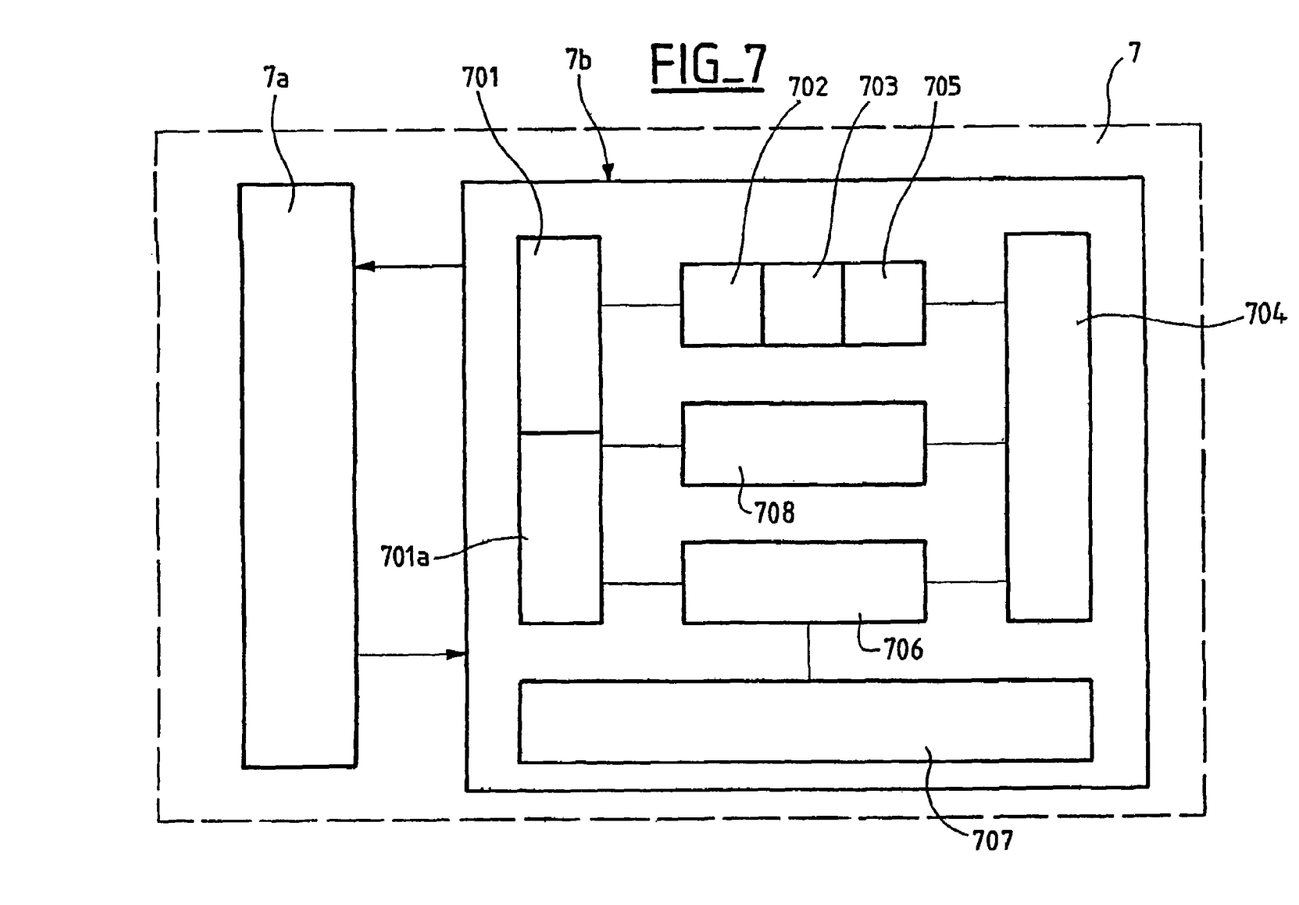
FIG. 7 represents a general organizational diagram of the different parts of the system and of the different interactions between the said parts.

Other characteristics and advantages of the invention will become clear from reading the description of embodiments of the invention, given by way of indicative and non-limitative example, and from reading:

FIG. 6, which represents a general view of the system that permits the detection of objects by using the method according to the present application, FIG. 7, which represents a general organizational diagram of the different parts of the system and of the different interactions between the said parts.

In the described embodiment, the object of the method and of the system is to detect the presence of a new object that is relatively stationary for at least 3 seconds. It is supposed that the object being searched for has a size, within the image, that falls between two numbers of pixels—in the sense that the object occupies, within the image, a number of pixels falling within an interval. This interval is determined empirically by means of tests.

The thresholds in the described example were chosen so as to reflect the properties of the object being searched for; that is the size of the object in the image, and its contrast.

A description will now be given of FIG. 6, which represents a general view of the system for detecting objects by using the method according to the present application.

The object of the system is to detect new objects 1, especially a swimmer situated in a swimming pool under the surface of the water or at the interface 2. The scene 3 is illuminated by lights that are not necessarily controlled.

An assembly of detecting means, especially a sensor such as a video camera 4 of CDD type, produces at successive instants a succession of video images of observed zone 3 in which object 1 is situated. These images are represented by electrical signals. Advantageously, a polarizing filter 8 is used to eliminate light reflections, at least partly.

Digitizing means 6 (especially a CDD image digitizing board) permit digitization of the said signals in order to obtain data, especially pixel values, corresponding to each video image.

Finally, means for processing the said data, especially a computer 7 provided with a memory 7a and a processor 7b, permit discrimination of new objects to be achieved in the manner that will now be described. The digital image data are stored in memory 7a. Processor 7b is provided with means for estimating the nature of an object and the trajectory and changes in attitude of the object.

The said means for estimating the nature of an object and the trajectory and changes in attitude of the object are provided with information-processing means for extracting, from the said successive images, primitives and/or calottes which are not very sensitive to the illumination conditions and are suitable for use for efficient discrimination between light spots and objects.

A description will now be given of FIG. 7, which represents a general organizational diagram of the different interactions between the parts of the system.

According to a first embodiment (designated the first branch), which is not exclusive of the second branch described hereinafter, processor 7b of the said system comprises:

associating means 701 for associating a primitive or primitives (within the meaning of the present invention) with each pixel, first counting means 702, associated with a clock 704, for counting, at regular time intervals dt over a time period T1, for each pixel and for each of the primitives associated with the said pixel, the number N1 of times that each primitive is materialized.

If the number N1 of times that a primitive is materialized exceeds a threshold S1, the said primitive is said to be usually materialized during the time period T1; in the opposite case the said primitive is said to be usually not materialized during the time period T1.

Processor 7b of the said system also comprises second counting means 703, which can be the same as the first counting means. These second counting means 703, associated with clock 704, count, at regular time intervals dt during a time period T2 chosen to be shorter than T1, for each pixel and for each of the primitives associated with the said pixel, the number N2 of times that each primitive is materialized. If the number N2 of times that the said primitive is materialized exceeds a threshold S2, the said primitive is said to be usually materialized during the time period T2; in the opposite case the said primitive is said to be usually not materialized during the time period T2.

Processor 7b of the said system also comprises discriminating means 708 for determining whether a change has occurred in a primitive associated with a pixel, by applying one or the other of the following criteria. Discriminating means 708 determine:
  either whether the said primitive is usually materialized during the time period T1 and is usually not materialized during the time period T2,
  or whether the said primitive is usually materialized during the time period T2 and is usually not materialized during the time period T1.

Processor 7b of the system also comprises third counting means 705, which can be the same as the first and the second counting means. The third counting means 705, associated with clock 704, count, for each pixel, the number N3 of changes in the primitives associated with the said pixel. If the number N3 of changes exceeds a threshold S3, equal in particular to half of the number of primitives associated with the said pixel, it is said that a change has occurred in the said pixel.

Processor 7b of the system also comprises detecting means 706 for detecting whether a new object has appeared, by determining whether a change has occurred in a connected set of pixels.

A description will now be given of a second embodiment (designated the second branch). This second embodiment, which is not exclusive of the first, can be operated by using the same elements. They will be represented by the same numerical symbols in the remainder of the description.

According to this second embodiment, processor 7b of the said system comprises associating means 701 for associating one or more characteristics with the calottes. Processor 7b comprises selecting means 701a for selecting the calottes whose characteristics exceed a threshold. Processor 7b also comprises fourth counting means 702, 703, 705, associated with a clock 704, for counting, for each pixel, at regular time intervals dt during a time period T1, the number N1 of times that the said pixel belongs to the said calotte. If the number N1 of times that the said pixel belongs to the said selected calotte exceeds a threshold S1, the said pixel is said to be usually present during the time period T1; in the opposite case the said pixel is said to be usually not present during the time period T1. Processor 7b of the said system also comprises fifth counting means 702, 703, 705, associated with a clock 704, for counting, at regular time intervals dt during a time period T2 chosen to be shorter than T1, for each pixel, the number N2 of times that the said pixel belongs to the said selected calotte. If the number N2 of times that the said pixel belongs to the said calotte exceeds a threshold S2, the said pixel is said to be usually present during the time period T2; in the opposite case the said pixel is said to be usually not present during the time period T2.

Processor 7b of the said system also comprises discriminating means 708 for determining whether a change has occurred in a pixel, by applying one or the other of the following criteria. The discriminating means determine:
  either whether the said pixel is usually present during the time period T1 and is usually not present during the time period T2,
  or whether the said pixel is usually present during the time period T2 and is usually not present during the time period T1.

Processor 7b of the said system also comprises detecting means 706 for detecting whether a new object has appeared, by detecting whether a change has occurred in a connected set of pixels.

In the case of both the first embodiment and the second embodiment, processor 7b of the system also comprises alarm means 707 for tripping an alarm signal in the event of suspect trajectory or movement of the said object.

In the embodiment to be described hereinafter with reference to FIGS. 3a and 4a, the method for detecting the presence of a new object that is relatively stationary for at least 3 seconds uses the concepts of branches 1 and 2 simultaneously.

In fact, there are used as primitives associated with a pixel (within the meaning of the definition explained hereinabove) the following two primitives: presence in a significant calotte of positive type, and presence in a significant calotte of negative type. To define the presence in a significant calotte of positive type and in a significant calotte of negative type, the following characteristics are used.

The area (the number of pixels of the calotte) must be larger than 3 and smaller than 10. Thus only objects that are neither too small nor too large in the image are considered. The "volume", defined as the absolute value of the sum of the differences between the value of each pixel of the calotte and the level of the calotte, must be larger than 6. In this way only sufficiently contrasted objects are of interest.

The signal produced by camera 4 is digitized every second by using, in a manner known in itself, a digitizing board 6 as well as a computer 7 equipped with a memory 7a and with a processor 7b. All of the positive and negative calottes are examined, but only the significant calottes are retained. In the pixels belonging to the significant calottes, therefore, at least one of the two primitives is materialized.

Within the meaning of the present embodiment, a primitive is said to be materialized if and only if the pixel with which the primitive is associated belongs to a significant calotte of the positive type or to a significant calotte of the negative type.

For example, the digitized image represented in FIG. 3a contains the following positive calottes:
  A calotte of level 3, composed of the single pixel whose value is 4. Its area is 1. Since its area is smaller than 3, it is not significant.
  A calotte of level 2, whose border is highlighted in bold in FIG. 3a. Its area is 4 and its volume 5. Since its volume is smaller than 6, it is not significant.

As an example, the digitized image represented in FIG. 4a contains the following positive calottes: two calottes of level 1 surrounded by the two bold borders. One of those (that on the right) has an area of 2 pixels, and is therefore not significant. The other has an area of 8 pixels and a volume of 13. It is therefore significant.

Thus the image represented in FIG. 4a contains only a single significant positive calotte. Similarly, an examination of the calottes of negative type does not reveal any significant calotte of negative type in this same image. The 8 pixels surrounded by the bold border in the left part of FIG. 4a are therefore the only pixels containing at least one materialized primitive.

For each of the pixels, the history of materialization of these primitives over the preceding 10 seconds is stored in memory. On the basis of this history, the number of times that each primitive of each of the pixels is materialized during the preceding 10 seconds and during the preceding 3 seconds is counted. If, in a pixel, a primitive is usually materialized (or usually not materialized) during the preceding 10 seconds, but the number of materializations is not in the majority (or is not in the minority) during the preceding 3 seconds, it is said that a change takes place in this pixel.

In this way, a map of the pixels in which a change takes place is established in memory. A connected set of such pixels indicates the presence of a new object, whose size in the image is given by the number of pixels present in the set.

If the size of such a set exceeds 3 pixels without exceeding 10 pixels, what has then been detected is the presence of a new object, which has been relatively stationary over the preceding 3 seconds and whose size is within the specified interval.

The invention claimed is:

1. A method for detecting new objects in an illuminated scene, the scene being observed by at least one sensor, configured to deliver a succession of images, the method comprising:

detecting and producing the succession of images in a form of electrical signals at successive instants;

digitizing the electrical signals and producing digital image data at successive instants;

storing the digital image data;

estimating a nature of an object and a trajectory and changes in attitude of the object;

the estimating the nature of the object and the trajectory and changes in attitude of the object including extracting, from the succession of images, at least one of primitives and calottes that are configured to be used for efficient discrimination between light spots and objects, wherein the digital image data includes pixels, and the method further comprising:

associating a primitive or primitives with each pixel;

counting, at regular time intervals over a time period T1, for each pixel and for each of the primitives associated with the respective pixel, a number N1 of times that each primitive is materialized, wherein if the number N1 of times that a primitive is materialized exceeds a threshold S1, the primitive is determined to be usually materialized during the time period T1, and if the number N1 does not exceed the threshold S1, the primitive is determined to be usually not materialized during the time period T1;

counting, at regular time intervals during a time period T2 shorter than T1, for each pixel and for each of the primitives associated with the respective pixel, a number N2 of times that each primitive is materialized, wherein if the number N2 of times that the primitive is materialized exceeds a threshold S2, the primitive is determined to be usually materialized during the time period T2, and if the number N2 does not exceed the threshold S2, the primitive is determined to be usually not materialized during the time period T2;

determining whether a change has occurred in a primitive associated with a pixel, by applying at least one of criteria: (1) the primitive is usually materialized during the time period T1 and is usually not materialized during the time period T2, and (2) the primitive is usually materialized during the time period T2 and is usually not materialized during the time period T1;

counting, for each pixel, a number N3 of changes in the primitives associated with the respective pixel, wherein if the number N3 of changes exceeds a threshold S3, equal to half of the number of primitives associated with the respective pixel, it is determined that a change has occurred in the respective pixel;

detecting whether a new object has appeared, by determining whether a change has occurred in a connected set of pixels.

2. A method according to claim 1, further comprising:

tripping an alarm means in an event of a suspect trajectory or movement of the object.

3. A method for detecting new objects in an illuminated scene, the scene being observed by at least one sensor, configured to deliver a succession of images, the method comprising:

detecting and producing the succession of images in a form of electrical signals at successive instants;

digitizing the electrical signals and producing digital image data at successive instants;

storing the digital image data;

estimating a nature of an object and a trajectory and changes in attitude of the object;

the estimating the nature of the object and the trajectory and changes in attitude of the object including extracting, from the succession of images, at least one of primitives and calottes that are configured to be used for efficient discrimination between light spots and objects, further comprising:

associating one or more characteristics with the calottes;

selecting the calottes whose characteristics exceed a threshold;

counting, for each pixel, at regular time intervals during a time period T1, a number N1 of times that the respective pixel belongs to the selected calotte, wherein if the number N1 of times that the respective pixel belongs to the selected calotte exceeds a threshold S1, the respective pixel is determined to be usually present during the time period T1, and if the number N1 does not exceed the threshold S1, the respective pixel is determined to be usually not present during the time period T1;

counting, at regular time intervals during a time period T2 shorter than T1, for each pixel, the number N2 of times that the respective pixel belongs to the selected calotte, wherein if the number N2 of times that the respective pixel belongs to the selected calotte exceeds a threshold S2, the respective pixel is determined to be usually present during the time period T2, and if the number N2 does not exceed the threshold 52, the respective pixel is determined to be usually not present during the time period T2;

determining whether a change has occurred in a pixel, by applying one of criteria: (1) the pixel is usually present during the time period T1 and is usually not present during the time period T2, and (2) the pixel is usually present during the time period T2 and is usually not present during the time period T1;

detecting whether a new object has appeared, by detecting whether a change has occurred in a connected set of pixels.

4. A method according to claim 3, the method further comprising:

tripping an alarm in an event of a suspect trajectory or movement of the object.

* * * * *

UNITED STATES PATENT AND TRADEMARK OFFICE
CERTIFICATE OF CORRECTION

PATENT NO.         : 7,302,081 B2                                    Page 1 of 1
APPLICATION NO. : 10/432619
DATED              : November 27, 2007
INVENTOR(S)      : Jerome Meniere et al.

It is certified that error appears in the above-identified patent and that said Letters Patent is hereby corrected as shown below:

On the Title Page, Item (87)
Please change the PCT publication date on front page from "January 13, 2002" to --June 13, 2002--.

Signed and Sealed this

Tenth Day of June, 2008

JON W. DUDAS
*Director of the United States Patent and Trademark Office*